UNITED STATES PATENT OFFICE 3,699,113
Patented Oct. 17, 1972

3,699,113
PROCESS FOR PREPARING PYRIDOXINE-CYCLIC-PHOSPHATE
Masao Tanaka, Shizuoka-ken, Teruo Kishi, Tokyo-to, and Kazuyuki Mineura, Shizuoka-ken, Japan, assignors to Kyowa Hakko Kogyo Kabushiki Kaisha, Tokyo-to, Japan
Continuation-in-part of abandoned application Ser. No. 744,962, July 15, 1968. This application Feb. 1, 1971, Ser. No. 111,660
Int. Cl. C07d 31/30
U.S. Cl. 260—297 V          7 Claims

ABSTRACT OF THE DISCLOSURE

The present invention relates to preparation of pyridoxine-cyclic-phosphate by direct phosphorylation of pyridoxine or its salts with poly-phosporic acid.

RELATED APPLICATIONS

Figure 1:
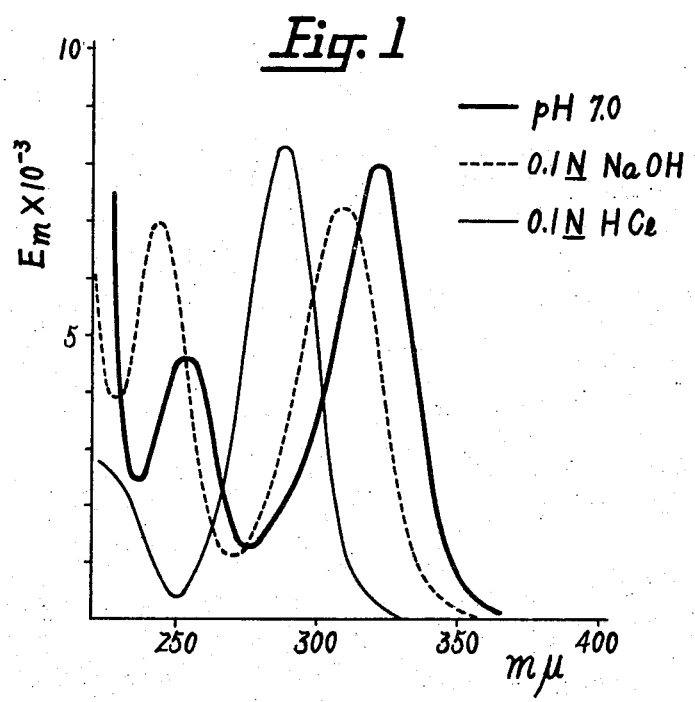

The present application is a continuation-in-part of our U.S. Ser. No. 744,962, filed July 15, 1968, now abandoned.

BACKGROUND OF INVENTION

The present invention relates to a process for the preparation of pyridoxine - 4,5 - cyclic-phosphate (hereinafter designated as PIN-cyc-P) having the formula:

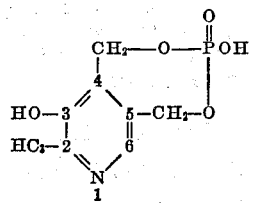

Pyridioxine or vitamin $B_6$ is a very important compound as a precursor of pyridoxal - 5 - phosphate which is a coenzyme of various enzymatic reactions in living bodies. It is considered as a main passage to the biological synthesis of pyridoxal - 5 - phosphate from pyridoxine that OH— group at the 5-position of pyridoxine is phosphorylated to produce pyridoxine - 5 - phosphate which is then oxidized to give pyridoxal - 5 - phosphate. The present inventors have carried out studies regarding various derivatives of pyridoxine which is the intermediate of the above mentioned pyridoxal - 5 - phosphate in synthesis, and have found that PIN-cyc-P also can be an advantageous intermediate.

The conversion of PIN-cyc-P to pyridoxal - 5 - phosphate by photo-oxidation is described in U.S. Pat. 3,527,683, the specification of which is hereby incorporated by reference. Basically, the photo-oxidation is preferably carried out in the presence of a photo-sensitizer such as a flavin compound using temperatures of 0 to 100° C. and a pH of 6 to 12. Water may be used as a solvent with any suitable source of visible or ultraviolet rays serving as the light source. Preferably, the amount of illumination is 1,000 to 20,000 luxes. An amino compound is preferably present. The pyridoxal - 5 - phosphate thus formed is a known biochemically active form of vitamin $B_6$, and is recognized as an important co-enzyme for various enzymatic reactions in living bodies.

As a result of further studies in the process of commercial production of PIN-cyc-P, the process of the present invention has now been discovered in which the desired PIN-cyc-P is produced with a favorable yield by phosphorylating pyridoxine or the salt thereof directly with polyphosphoric acid. In the prior art of the direct phosphorylation of pyridoxine with polyphosphoric acid, only one process (Japan patent publication No. 18,040/1964, issued as Japanese Pat. 316,693) is known. This process produces phosphoric acid esters of pyridoxine, and is characterized by introducing pyridoxine into a mixed solution of phosphoric acid with phosphoric anhydride and subjecting it to reaction for several hours under elevated temperature conditions (by heating), and then adding to the reaction mixture an alcohol and ether, and cooling the same. In this process, because both the reaction conditions and the after-treatments are unfavorable, rather than PIN-cyc-P, pyridoxine - 5 - phosphate and/or pyridoxine - 4 - phosphate is obtained as final products.

SUMMARY OF INVENTION

In contrast, according to the process of the present invention, PIN-cyc-P containing almost no pyridoxine-5-phosphate nor pyridoxine - 4 - phosphate can be obtained with a good yield. The present invention is advantageous regarding not only the production of the desired product in good yields but also the formation of highly purified crystals. Purification of these crystals is very simple in connection with the separation of PIN-cyc-P crystals after the reaction.

According to the present invention, the desired product of PIN-cyc-P can be obtained by directly phosphorylating pyridoxine or its salts such as the hydrochloric acid salt with polyphosphoric acid. In contrast with the process of Japanese Pat. 316,693, the present process employs ambient or lower temperatures and produces PIN-cyc-P.

Suitable salts of pyridoxine are therapeutically acceptable non-toxic salts, and include hydrochloric acid salts.

For the purpose of the present invention, it is preferred to use polyphosphoric acid prepared in conventional manner by mixing phosphoric acid with phosphoric anhydride, although the polyphosphoric acid can be obtained by various alternative methods. As to the mixing ratio, wide range of ratios can be applied. However, a ratio of 1 to 1.2 parts of phosphoric anhydride to 1 part of phosphoric acid gives favorable results.

The amount of polyphosphoric acid employed is preferably 1 to 10 times by weight of pyridoxine. Production of PIN-cyc-P occurs at a reaction temperature below 40° C. As the production yield has a relationship with the reaction time, it is preferred to carry out the reaction at a low temperature within a range between room temperature and —20° C. in order to give a stable yield. Since PIN-cyc-P may decompose at an excessively elevated temperature, reaction at an elevated temperature for a short time is not preferable. The time period necessary for the reaction is about 4 hours at room temperature and can be shortened at an elevated temperature. It generally ranges from 15 min. to 10 hours. The reaction can be carried out without agitation but is completed within a shorter time with agitation.

After completion of the reaction, water is added and the reaction mixture heated to hydrolyze polyphoric acid ester. Then, desired PIN-cyc-P is separated from the resultant crude aqueous solution. For the purification of the product, neutralization with calcium salt or barium salt, chromatography using ion exchange resin, etc. can be carried out and the purified aqueous solution obtained (e.g. pH 4 to 7) concentrated with an adjusted pH. The product can be separated as highly purified crystals in a good yield. When the pH of the solution becomes alkaline in purification, decomposition of PIN-cyc-P occurs. Therefore, alkaline conditions should be avoided for any length of time.

The product obtained was confirmed to be pyridoxine-4,5 - cyclic - monophosphate having the before-mentioned composition from infra-red absorption spectrum, ultraviolet absorption spectrum, nuclear magnetic resonance spectrum, analytical values obtained e.g. from composition analysis, elemental analysis etc., the results from the reactions with quinone chlorimid reagent and ferric chloride as well as pK value.

Figure 2:
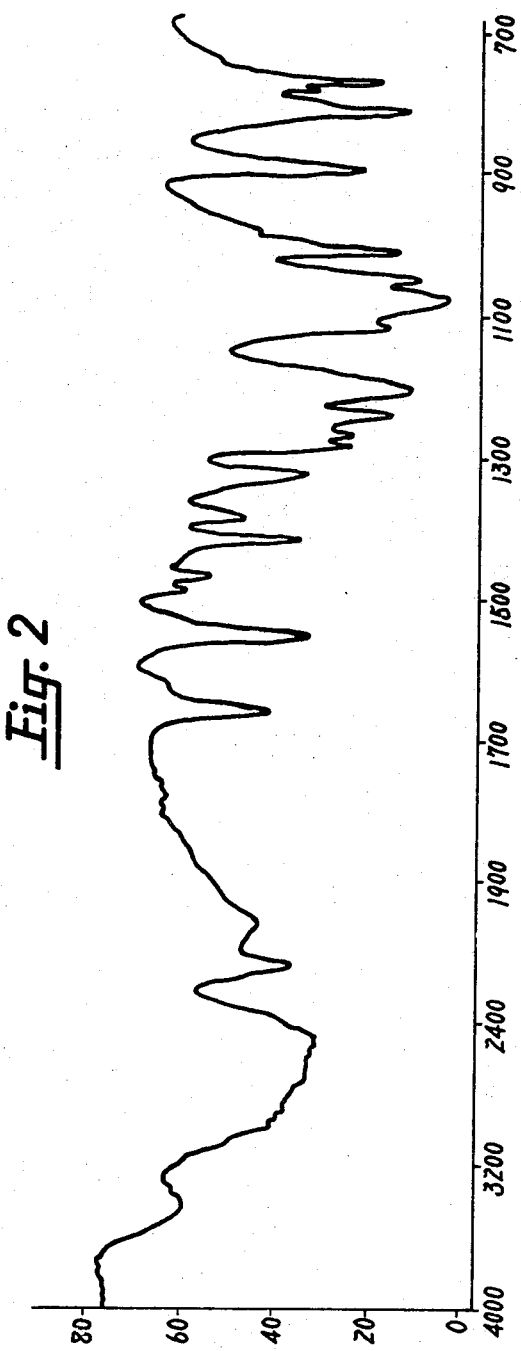

FIG. 1 shows ultraviolet absorption spectrum of pyridoxine-4,5-cyclic-phosphate obtained according to the present invention and FIG. 2 shows infra-red absorption spectrum thereof.

EXAMPLE 1

10 g. of hydrochloric acid salt of pyridoxine was added to 50 g. of polyphosphoric acid prepared by mixing 1 part of phosphoric acid and 1 part of phosphoric anhydride, and reacted at 20° C. for 6 hours. After the completion of the reaction, 150 ml. of water was added to the reaction mixture and the resultant aqueous solution was heated at 100° C. for 1 hour to decompose polyphosphoric acid ester. After cooling, the solution was neutralized with barium carbonate and the precipitate produced was removed by filtration. The filtrate and the wash were combined, concentrated in vacuo to 50 ml. and pH was adjusted to 2.5 with hydrochloric acid. Upon allowing it to cool by standing, while needle crystals appeared. The crude crystals were separated by filtration and dissolved in water. The solution was adjusted to a pH 6.0 and purified by using weakly acidic ion exchange resin Amberlite CG 50 (available from Rohm & Haas Co., U.S.A.) ($NH_4$-form). Gathering the fractions having absorption at 320 m$\mu$, the fractions were again concentrated and adjusted to pH 2.5 to crystallize. The crystals were separated by filtration and dried to give 5.5 g. of the desired product of PIN-cyc-P.

The crystal produced was hardly soluble in water but easily soluble in neutral to alkaline water, and is almost or entirely insoluble in methanol, ethanol, acetone, ether, chloroform and dimethylformamide. The crystal is browned at a temperature higher than 160° C. However, it shows no distinct melting point nor decomposing point at a temperature below 250° C. Gibbs reaction with quinone chlorimid agent and ferric chloride reaction are positive. Its molecular formula was $C_8H_{10}O_5NP$ (molecular weight: 231.14).

|  | Elemental analysis | | | | Analytical value (mole) | |
| --- | --- | --- | --- | --- | --- | --- |
|  | C | H | N | P | Pyridoxine | Phosphorus |
| Observed | 41.81 | 4.57 | 5.81 | 13.02 | 1.11 | 0.98 |
| Calculated | 41.58 | 4.33 | 6.06 | 13.39 | 1.00 | 1.00 |

Infra-red absorption spectrum and ultraviolet absorption spectrum are as shown in the drawings.

EXAMPLE 2

50 g. of polyphosphoric acid prepared by mixing 1 part of 85% phosphoric acid and 1 part of phosphoric anhydride was added to 10 g. of pyridoxine and reacted at 0° C. for 12 hours. After the completion of the reaction, 150 ml. of water was added to the reaction solution and the mixture heated at 100° C. for 1 hour. The crude aqueous solution was purified in the same manner as in Example 1 to give 7.2 g. of PIN-cyc-P.

Having described the present invention, that which is sought to be protected is set forth in the following claims.

What is claimed is:

1. A process for preparing pyridoxine-4,5-cyclic-monophosphate which consists essentially of phosphorylating pyridoxine with polyphosphoric acid at a temperature between −20° C. and 40° C.

2. The process of claim 1 wherein said polyphosphoric acid has been prepared by mixing phosphoric acid with phosphoric anhydride.

3. The process of claim 1 wherein 1 to 10 parts by weight of polyphosphoric acid is used per part of pyridoxine.

4. The process of claim 1 which is carried out at a temperature −20° C. to room temperature.

5. The process of claim 1 wherein after reaction is completed water is added, and the reaction mixture heated to hydrolyse polyphosphoric acid ester, and then separating pyridoxine-4,5-cyclic-monophosphate from the resultant amide aqueous solution.

6. The process of claim 1 wherein pyridoxine hydrochloride is employed as the pyridoxine source.

7. The process of claim 1 wherein the reaction time varies from 15 min. to 10 hours.

References Cited

UNITED STATES PATENTS 3,527,755    9/1970    Murakami et al. ___ 260—297 V

ALAN L. ROTMAN, Primary Examiner

U.S. Cl. X.R.

260—297.5; 424—263

UNITED STATES PATENT OFFICE
CERTIFICATE OF CORRECTION

Patent No. 3,699,113           Dated October 17, 1972

Inventor(s) MASAO TANAKA, ET AL

It is certified that error appears in the above-identified patent and that said Letters Patent are hereby corrected as shown below:

-- [30] Foreign Application Priority Data

July 15, 1967 Japan.................45035/67 --

Signed and sealed this 1st day of May 1973.

(SEAL)
Attest:

EDWARD M. FLETCHER, JR.      ROBERT GOTTSCHALK
Attesting Officer              Commissioner of Patents